United States Patent
Hoff et al.

(10) Patent No.: US 8,008,883 B2
(45) Date of Patent: Aug. 30, 2011

(54) METHOD OF ADJUSTING A MOTORIZED SOLAR PROTECTION INSTALLATION WITH NO HARD END-STOP

(75) Inventors: Laurent Hoff, Peillonnex (FR); Eric Guillemot, Scionzier (FR)

(73) Assignee: Somfy SAS, Cluses (FR)

( * ) Notice: Subject to any disclaimer, the term of this patent is extended or adjusted under 35 U.S.C. 154(b) by 435 days.

(21) Appl. No.: 12/341,694

(22) Filed: Dec. 22, 2008

(65) Prior Publication Data

US 2009/0165779 A1    Jul. 2, 2009

(30) Foreign Application Priority Data

Dec. 26, 2007 (FR) ...................................... 07 09100

(51) Int. Cl.
*H02P 1/04* (2006.01)
*G05B 15/00* (2006.01)

(52) U.S. Cl. ........ 318/480; 318/460; 318/466; 318/468; 160/7; 160/84.02; 700/275

(58) Field of Classification Search .................. 318/460, 318/480, 466, 468, 445, 434, 266, 280; 160/7, 160/84.02; 700/275
See application file for complete search history.

(56) References Cited

U.S. PATENT DOCUMENTS

| | | | |
|---|---|---|---|
| 5,850,131 A | | 12/1998 | Wolfer et al. |
| 6,867,565 B2 * | | 3/2005 | Maistre et al. ............... 318/468 |
| 7,242,162 B2 * | | 7/2007 | Goth ............................ 318/480 |
| 7,418,313 B2 * | | 8/2008 | Devis et al. ................... 700/286 |
| 7,445,035 B2 * | | 11/2008 | Bruno et al. .................. 160/310 |
| 7,469,591 B1 * | | 12/2008 | Chuang .......................... 73/732 |
| 7,701,160 B2 * | | 4/2010 | Grehant et al. ............... 318/445 |
| 2003/0030950 A1 | | 2/2003 | Bruno |
| 2003/0210008 A1 * | | 11/2003 | Maistre et al. ................ 318/468 |
| 2005/0039863 A1 * | | 2/2005 | Bruno ........................... 160/130 |
| 2005/0039865 A1 * | | 2/2005 | Bruno et al. .................. 160/310 |
| 2005/0067989 A1 * | | 3/2005 | Lagarde et al. ............... 318/466 |
| 2006/0033460 A1 * | | 2/2006 | D'ayot ......................... 318/280 |

FOREIGN PATENT DOCUMENTS

| | | |
|---|---|---|
| DE | 4200092 A1 | 7/1993 |
| EP | 0770757 A2 | 3/1990 |
| EP | 0905592 | 3/1999 |
| WO | WO 03/050629 A1 | 6/2003 |

OTHER PUBLICATIONS

International Search Report.

* cited by examiner

*Primary Examiner* — Paul Ip
(74) *Attorney, Agent, or Firm* — Frommer Lawrence & Haug LLP; Ronald R. Santucci

(57) ABSTRACT

A method of adjusting a motorized solar protection installation (1) comprising a screen (3) that can be displaced by activation of an actuator (6) provided with an electronic position counting device (7) and means (9) of detecting an obstacle to the movement, comprising the following steps:
storage of a first end-of-travel position,
displacement of the screen by activation of the actuator towards the first stored end-of-travel position, continued beyond the first stored end-of-travel position as far as a position that can be assimilated to an end-stop, detected by the means of detecting an obstacle to the movement,
measurement of the position difference between the first stored end-of-travel position and the position that can be assimilated to an end-stop,
storage of this measurement in memory.

11 Claims, 3 Drawing Sheets

METHOD OF ADJUSTING A MOTORIZED SOLAR PROTECTION INSTALLATION WITH NO HARD END-STOP

This application claims priority benefits from French Patent Application No. FR 0709100 filed Dec. 26, 2007, the disclosure of which is hereby incorporated by reference.

BACKGROUND OF THE INVENTION

The invention relates to the field of automated solar protections, in particular roller blinds driven by an actuator. A fabric included in the blind is designed to be wound onto a tube, called winding tube, the latter being rotated by the actuator.

Tubular actuators are commonly used for these automatic operations. They are placed inside the winding tube and make it possible to unwind or wind the fabric of the blind without effort on the part of the user.

Alternatively, the invention also relates to blinds being folded in the top position against a rail, the movement being driven by an actuator acting on cords or laces being wound around drums located in the rail.

When associated with remote controls, automatic control functions or sensors, the blind can be operated remotely, without necessarily the intervention of the user (for example, automatic unwinding when the sun is out, at a fixed time, to protect both a terrace or windows from excessive overheating in summer, automatic winding in the case of wind to protect the blind itself).

Electromechanical actuators are generally connected to the mains for their power supply. To prevent cases of emergency use in the event of a power outage, some versions are provided with a backup manual control. The actuator then combines both automatic and manual functions.

For the operation of the actuator, it is preferable for the latter to know the deployment position of the blind, in order to manage in particular the particular operations in different areas of travel: arrival at the top point, arrival at the bottom point, locking area for the awning blind's deployment arms.

DESCRIPTION OF THE PRIOR ART

In the state of the art, various counting-based position determination solutions are available, the latter mainly being divided between electronic or mechanical counting devices.

In the existing products, such a position is commonly determined thanks to a mechanical counting device. A movement of the screen is mechanically transcribed by the counting device in one direction or the other. For adjusting the end-of-travel positions it is generally needed to access the actuator. In use, regardless of the source behind the movement (motorized or manual), counting is active and the positions are always well identified.

Electronic counting devices are also widely available on the market. These operate in particular by incrementing/decrementing a counter which represents the current position. The current position is identified in a non-volatile electronic memory, which makes it possible to retain the information even in the event of a current outage. Such an electronic counting device can be adjusted remotely, which obviously offers numerous advantages, the actuators not being easily accessible once fitted on site.

However, in particular when such actuators with electronic counting device are provided with a backup manual control, a manual movement performed at the time of a current outage can misadjust the position count: in practice, the blind is displaced without the electronic counting system changing the current position value. It is also improbable that the blind will be returned to the initial position after this manual operation. The position stored in memory therefore no longer corresponds to the current position, in other words the installation is out of adjustment.

One simple practice is to detect the current interruptions or activation of the manual operation and to recalibrate the system to an end-stop (if one exists) when necessary; that is, occasionally and/or automatically.

Alternatively, regardless of the use of a backup manual control, drifts in the count can occur, in which case, it is also necessary to proceed with regular recalibrations.

This recalibration is based on the recognition of a fixed position, such as a hard end-stop. The position of this hard end-stop can be determined by analyzing the torque or a variation of the torque exerted by the motor, or of an under-speed. These parameters are then independent of the position count. The position of the end-stop is associated with a reference position value. The count can then be updated from this reference position unambiguously representing the current position of the blind.

The recognition of such an end-stop is known to those skilled in the art. Thus, the patent EP 1 269 596 describes a device for stopping the motor when the load on the motor exceeds a determined value. It comprises means of transforming the variation of the voltage at the terminals of a phase-shift capacitor, corresponding to a determined torque variation, into a chosen variation of the voltage regardless of the maximum torque developed, means of comparing the transformed voltage with a reference voltage and means of stopping the motor when the transformed voltage is less than the reference voltage.

Also known are numerous documents describing elements that can be displaced between two end-of-travel positions, one or both of the end-of-travel positions being chosen to be offset relative to hard end-stops accurately delimiting the maximum travel of the moving element. This offset is provided to avoid having the moving element always abut against the end-stop or stops on each operating cycle. For example, the application EP 0 905 592 describes a method of adjusting the end-of-travel positions of a door, in which, following the automatic recognition of an end-stop, the installer deliberately offsets the door by a certain distance, and stores the new position as the end-of-travel position.

Moreover, the document DE 42 00 092 describes a method of operating a sliding doorway. When being adjusted, the doorway is displaced by manual control between two columns forming end-stops in order to measure the trajectory in both directions. In operation, the trajectory actually traveled is shorter than the trajectory measured between the two columns, to also avoid having the moving element always abut against the end-stop or stops on each operating cycle.

Moreover, also known, from the document WO 03/050629, is a method of adjusting a roller blind in which, after the determination of two positions, a screen is driven beyond one of the stored positions, in particular beyond the bottom position. The aim of the latter step is to be able to analyze the kinematic link between the actuator and the moving screen. In practice, if an end-stop is encountered, the link is determined to be of "lock" type on which a mechanical stress must be exerted. If no end-stop is detected, the movement is stopped when a predetermined position is reached, the link of "foil" or "strap" type not allowing the bottom position to be significantly exceeded.

Although the method is attractive, it does not offer a solution in terms of recalibration in the case explained hereinbelow.

For different types of blinds, there is no hard end-stop. Such is in particular the case with awning blinds (without casing) with deployment arms, for which the maximum folded position of the deployment arms is only a position in which the movement is progressively hindered. It is in fact a position, that can then be assimilated to an end-stop, in which it is no longer possible to continue the force exerted to bring about a movement without risking damaging the installation.

In practice, it is desirable to avoid arriving in this position without taking particular precautions, such as, in particular, reducing the torque provided by the actuator or the speed of approach.

This position corresponds to a complete winding of the fabric of the blind. However, on installing and adjusting such a blind, the end-of-travel position is adjusted manually and does not correspond to that position assimilated to an end-stop.

Thus, there is no reference position dependent only on the installation and allowing for a recalibration on a loss-of-adjustment of the counting device.

The document EP 0 770 757 discloses a method of operating a motorized blind, comprising a procedure for adjusting/updating an end-of-travel position, in which an end-of-travel end-stop is tested.

SUMMARY OF THE INVENTION

The aim of the invention is to provide an adjustment method that overcomes the drawbacks stated above and that improves the adjustment methods known from the prior art. In particular, the invention makes it possible to provide a method of adjusting a motorized solar protection installation comprising an actuator provided with an electronic counting device and allows for a recalibration of this installation when necessary, without the intervention of the user, and without error. The inventive method thus also makes it possible to use detection thresholds that are low enough not to damage the installation when an end-stop or position that can be assimilated to an end-stop is detected. The invention also allows for adaptation to different existing procedures for adjusting an installation, without requiring an installer to change his usual practices.

According to the invention, the adjustment method is defined by claim 1.

Various embodiments are defined by the dependent claims 2 to 5.

According to the invention, the operating method is defined by claim 6.

Different embodiments are defined by the dependent claims 7 and 8.

According to the invention, an electromechanical actuator comprises hardware means and software means for implementing the adjustment method defined previously and/or for implementing the operating method defined previously.

According to the invention, a solar protection installation comprises an actuator defined previously.

The invention also relates to a computer program comprising a computer program code means suitable for controlling all the steps of one or other of the methods defined hereinabove when the program runs on a computer.

BRIEF DESCRIPTION OF THE DRAWING

The appended drawing represents, by way of example, an embodiment of a home automation installation according to the invention and a way of executing an adjustment method according to the invention.

DESCRIPTION OF THE PREFERRED EMBODIMENTS

Figure 1:
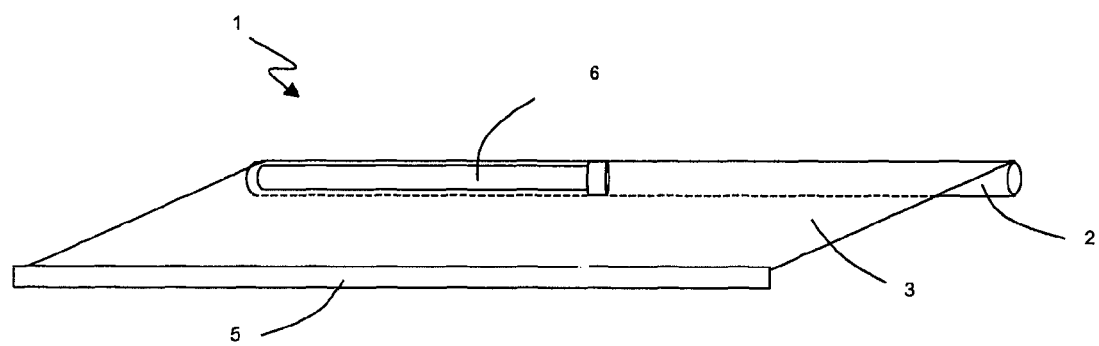
FIG. 1 is a diagram of a solar protection installation according to the invention.
Figure 2:
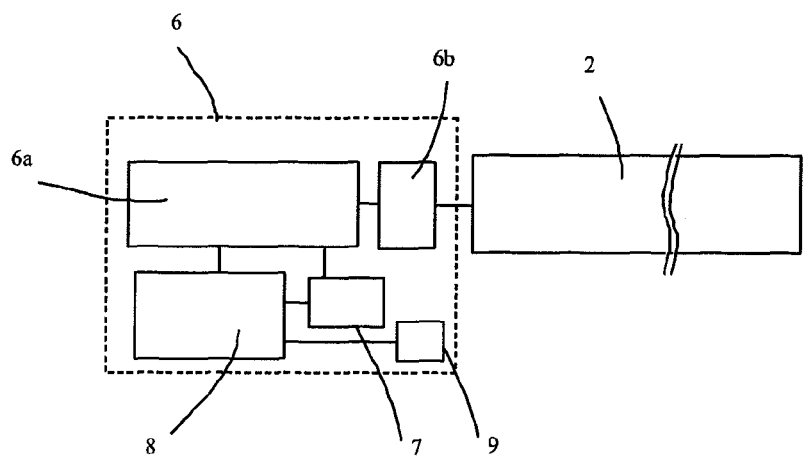
FIG. 2 is a diagram of an actuator of such an installation.

The solar protection installation 1 represented in FIGS. 1 and 2 comprises a winding tube 2 about which a blind fabric 3 is wound. The installation also comprises articulated arms (not represented) fitted on the one hand, by a first end, on a supporting structure. The other end of the arms is linked to a bar 5 fixed at the end of the fabric. A tubular actuator 6 inserted into the winding tube causes the latter to rotate. The actuator comprises a control unit 8 enabling it to manage control commands for deploying or folding the fabric. On a deployment command, the actuator authorizes an unfolding of the arms through the action of springs and a rotation of the winding tube in a first direction, which brings about a deployment of the fabric. Conversely, on a fold command, the actuator causes the winding tube to rotate in the reverse direction, causing the fabric to be pulled tight and the arms to be folded by applying stress to the springs.

The actuator 6 comprises a driving part or motor-gearbox 6a and a brake 6b. The brake is suitable for blocking the output shaft in rotation, in order to control the rotation speed and also keep the winding tube blocked.

The actuator also comprises a device 7 for counting a rotation position of the actuator, corresponding to a deployment position of the fabric. The counting device is of electronic type. It makes it possible to associate counter values with screen positions.

The actuator also comprises end-stop detection means 9. These means can, for example, work by detection of a predetermined torque, a torque variation, or by detection of a predetermined speed variation. The measured torque can, for example, be that exerted by the actuator 6 on the tube 2 that drives the fabric.

The electronic control unit 8 is used to manage control commands to rotate the winding tube in one direction or in the other, and to manage stops, thanks in particular to the information supplied by the counting device 7 and the end-stop detection means 9. The control unit also comprises software means, such as computer programs for implementing an operating method according to the invention, this method governing the operation of an arm-based blind actuator.

In particular, the actuator comprises an electronic position counting device, means of detecting an obstacle to the movement, means of storing a first end-of-travel position, means of displacing the screen by activation of the actuator beyond the first stored end-of-travel position as far as a position that can be assimilated to an end-stop, detected by the means of detecting an obstacle to the movement, means of measuring the position difference between the first stored end-of-travel position and the position that can be assimilated to an end-stop, and means of storing this measurement in memory.

The actuator can also comprise a means of using a current position datum of the screen and the difference value, stored in memory in an installation adjustment phase, to redefine a first end-of-travel position.

Figure 3:
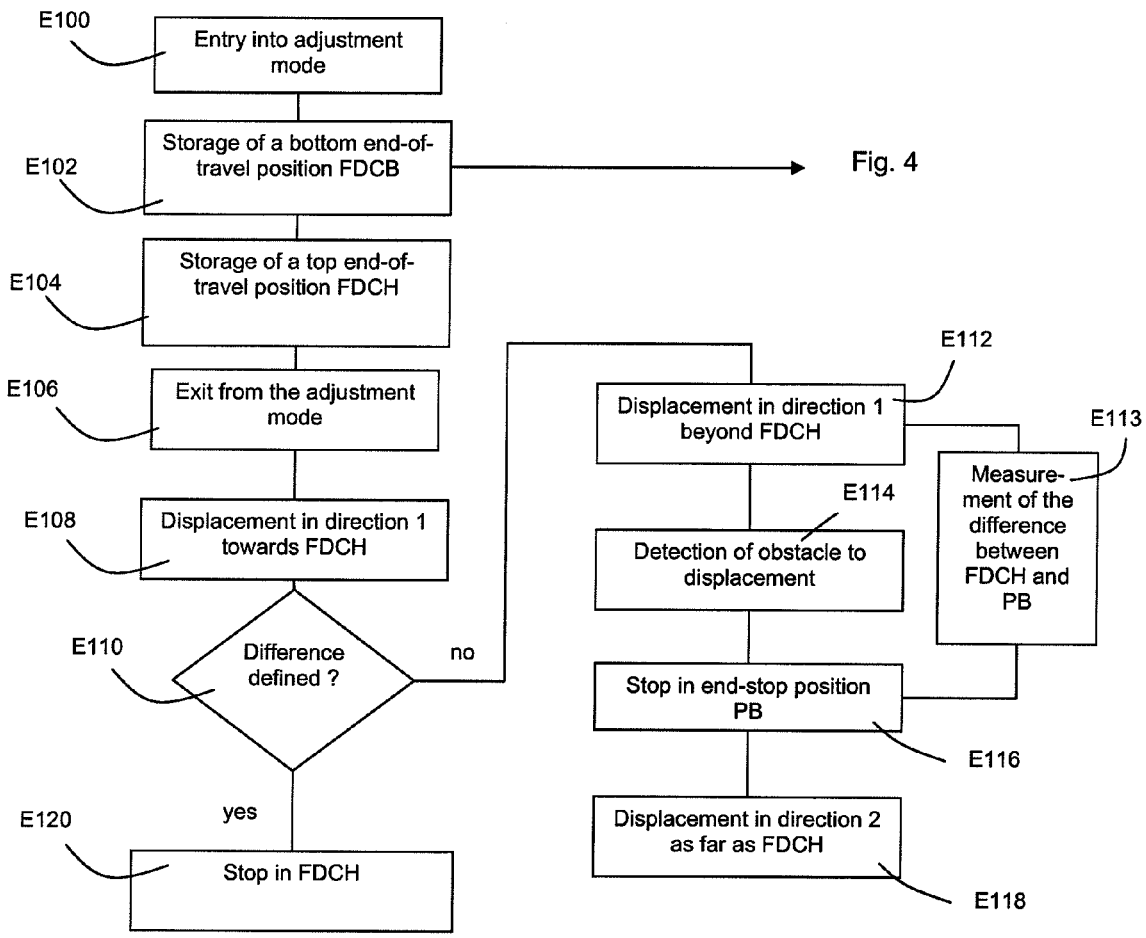
FIGS. 3 and 4 are flow diagrams illustrating a way of executing the adjustment method according to the invention.

FIG. 3 illustrates various steps of a way of executing the adjustment method according to the invention. A step E100 comprises entry into adjustment mode. This can be done by a user action such as a sequence of particular presses on a sender communicating with the receiver, or a particular and recognizable frequency for cutting off the power supply to the actuator. The actuator then awaits various adjustment actions. Each new adjustment step is validated according to an established scheme known to those skilled in the art. During a step E102, the installer activates the actuator to displace the fabric of the blind to a position that he wants to define as end-of-travel position. Validating this step E102 entails storing the current position as a reference position of the counting device. This position is, for example, the position that he defines as the bottom end-of-travel position FDCB, the fabric then being substantially fully extended and taut.

From this bottom end-of-travel position, the installer orders a folding of the fabric to a selected top end-of-travel position of the blind, in which the fabric is substantially fully wound. Validating this step E104 entails storing the current position reached, chosen by the installer as top end-of-travel position FDCH. This position FDCH can also be a reference position for the counting device.

Preferably, this position FDCH is not stored if it is situated at the point of an end-stop (or a position that can be assimilated to an end-stop) detected by the means of detecting an obstacle to the movement. The installer must then repeat the operation for storing the end-of-travel position.

Conversely, the bottom end-of-travel position FDCB can be stored before the top end-of-travel position FDCH.

The next step E106 is an exit from this manual adjustment mode; that is, an exit from the mode in which the installer intervenes, the subsequent steps being able to be executed automatically.

Following the step E106, a first displacement in a first direction toward the top end-of-travel position during a step E108 is followed by a step in which it is checked that a difference measurement is stored in memory (step E110).

This step is optional and could be replaced by a systematization: the first displacement toward the top end-of-travel would systematically be followed by the steps E112 to E118.

This step could also be replaced by a counter for performing this learning operation during the first cycle after the adjustment mode, and then repeating it regularly, for example every 200 cycles.

If a difference measurement must be performed, the actuator continues the movement during a step E112 beyond the top end-of-travel position stored during the step E102, until arrival in a position in which the movement is hindered (step E114). This particular physical feature is detected by the detection means 9 with, for example, a high sensitivity setting. The actuator then stops in the current position (step E116).

From the step E112 and until the obstacle is detected and the motor is stopped, the displacement distance is measured (step E113). The sensitivity threshold can, if necessary, be adjustable, but its value is then stored and linked to the distance measurement. This displacement distance or measured difference can be a negative value, if the first end-of-travel position is a reference position equal to zero.

After the step E116, in a step E118, the actuator again drives the blind to the top position stored during the step E102, thus ending the method of adjusting the blind without top end-stop. The difference could also be measured during the latter displacement.

If no difference measurement is necessary, the actuator stops the blind in the end-of-travel position stored during the step E102 (step E120).

Figure 4:
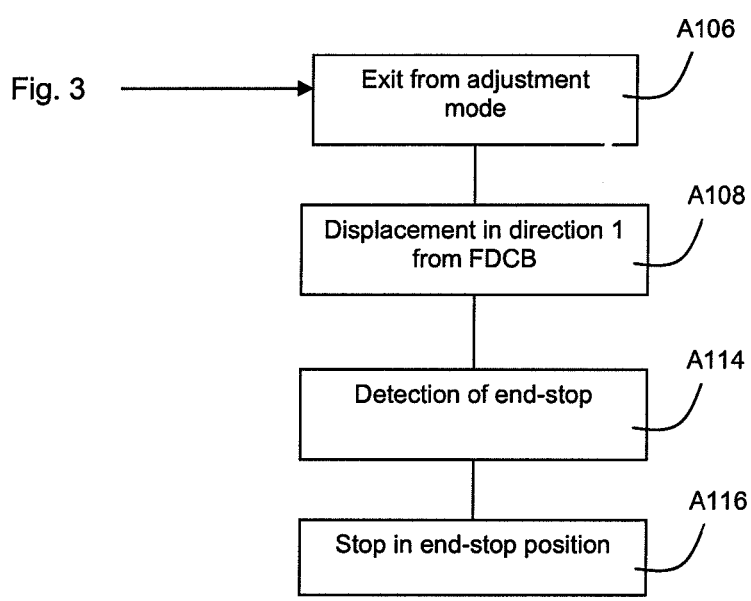

If the exit from the adjustment mode occurs after a single storing of end-of-travel, in particular the bottom end-of-travel, an alternative method applies, corresponding to the state of the art and described in FIG. 4. The step corresponding to the step E106 is then denoted A106. It is important to note that the actuator itself decides which method to apply from these steps E106/A106.

During this alternative method, during a displacement of the fabric under control of the actuator (step A108), the stopping of the displacement is controlled using the end-stop detection means 9 (steps A114 and A116).

Figure 5:
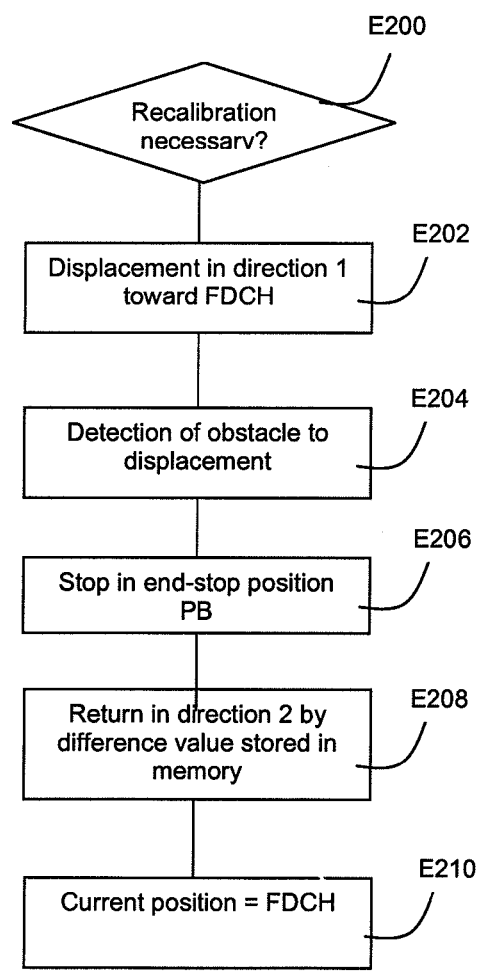
FIG. 5 is a flow diagram illustrating a way of executing the operating method according to the invention.

FIG. 5 shows a way of implementing the method of operating the installation for a recalibration. If such a recalibration is necessary according to the conditions stated above (step E200), a step E202 for displacement in the recalibration direction is implemented, for example toward a top position or folded position. When, in the step E204, an obstacle to the movement is detected, substantially in the same conditions as the detection during the adjustment step E114, the movement is stopped (step E206). During a step E208, the actuator then drives the screen in the reverse direction over a distance equal to the difference measured at the time of the adjustment during the step E113. The new position reached is then equivalent to the end-of-travel position stored at the time of the adjustment (step E210). A value corresponding to the new position reached is then stored in a memory of the actuator. It determines the new top end-of-travel position.

Alternatively, the value determining the new top end-of-travel position can be determined just after the step E206 in which the current position of the screen is determined. It is then sufficient to add (in the algebraic sense) the difference value measured at the time of the adjustment during the step E113 to the value given by the counting device and determining the current position of the screen.

The method according to the invention can be applied in the same way to a bottom end-of-travel position, or folded position, if means are available for recognizing a physical end-of-travel position characteristic that enables this position to be assimilated to an end-stop.

The benefit of finding a position that can be assimilated to an end-stop, once the end-of-travel position is stored, is to be able to adapt the characteristics of the end-stop detection to the position. Beyond the stored end-of-travel position, measures are put in place to avoid any impact or high stress in the position that can be assimilated to an end-stop. Thus, the sensitivity of the end-stop detection is higher, the torque is reduced and/or the speed of displacement is reduced.

In the case of a recalibration procedure, similar measures can be put in place over a part of the travel before arrival in the position that can be assimilated to an end-stop.

This method also offers the benefit of being able to be performed in a number of steps. The storing of the end-of-travel positions can take place in the factory, whereas the step for learning the difference between the position that can be assimilated to an end-stop and the stored end-of-travel position can take place once the product is installed on site, even over a number of cycles after installation. These two phases can therefore be separated in space and in time.

The adjustment ergonomics can be provided in an actuator that is compatible with blinds with top end-stop (cassette blinds) and blinds with bottom end-stop. In practice, the adjustment ergonomics define whether it is necessary to use the method according to the invention: for a cassette blind, only an end-of-travel position is stored, corresponding to the bottom end-of-travel position. The installer then signals the end of the adjustment procedure. For an awning blind, two end-of-travel positions are stored, and the installer then signals the end of the adjustment procedure. The adjustment procedure according to the invention will then be implemented only in the second case, automatically, without requiring any new intervention on the part of the installer.

If the adjustment method used were that described in the patent EP 0 905 592, the installer should perform the offset manually, before exiting from the adjustment mode. In other words, in practice, no distinction is drawn between a storing of a single end-of-travel, the other being defined by the end-stop detection in the case of the cassette blind, and the storing of the bottom end-of-travel and the detection of the position that can be assimilated to an end-stop in the case of the awning blind.

Moreover, the invention makes it possible, unlike the case of the patent EP 0 905 592, to define automatically, at the time of the adjustment, an approach zone in the vicinity of the end stop before reaching the physical reference position.

The invention therefore offers these benefits of automation of the adjustment method, while ensuring the protection of the installation.

The invention claimed is:

1. A method of adjusting a motorized solar protection installation (1) comprising a screen (3) that can be displaced by activation of an actuator (6) provided with an electronic position counting device (7) and means (9) of detecting an obstacle to the movement, comprising the following steps:
   a. storage of a first end-of-travel position,
   b. displacement of the screen by activation of the actuator towards the first stored end-of-travel position, continued beyond the first stored end-of-travel position as far as a position that can be assimilated to an end-stop, detected by the means of detecting an obstacle to the movement,
   c. measurement of the position difference between the first stored end-of-travel position and the position that can be assimilated to an end-stop,
   d. storage of this measurement in memory.

2. The adjustment method as claimed in claim 1, wherein the displacement of the screen is performed following a command given manually or automatically after entering into an automatic adjustment cycle.

3. The adjustment method as claimed in claim 1, which also comprises the following step:
   e. storage of a second end-of-travel position.

4. The adjustment method as claimed in claim 1, wherein, if it includes a step for exiting from an adjustment mode after storage of the first end-of-travel position, the steps b, c and d are not then carried out.

5. The adjustment method as claimed in claim 1, which lastly comprises the following step:
   f. displacement to the first end-of-travel position.

6. A method of operating a motorized solar protection installation comprising a screen (3) that can be displaced by activation of an actuator (6) provided with an electronic position counting device (7) and means (9) of detecting an obstacle to the movement, which comprises, in an installation recalibration phase, the following steps:
   displacement of the screen in a first direction, by activation of the actuator, as far as a position that can be assimilated to an end-stop,
   use of a current position datum of the screen and of the difference value, stored in memory in an installation adjustment phase according to the adjustment method as claimed in claim 1, to redefine a first end-of-travel position.

7. The operating method as claimed in claim 6, wherein the data usage step comprises the following substeps:
   displacement of the screen in a second direction, by activation of the actuator, by a value determined by the difference value stored in memory in an installation adjustment phase according to the adjustment method as claimed in claim 1,
   use of a current position datum of the screen to redefine a first end-of-travel position.

8. The operating method as claimed in claim 6, wherein the data usage step comprises the following substep:
   addition of the current position datum of the screen and of the difference value stored in memory in an installation adjustment phase according to the adjustment method as claimed in claim 1.

9. An electromechanical actuator (6) comprising hardware means (6a, 6b, 7, 8, 9) and software means for implementing the adjustment method as claimed in one of claims 1 to 4 and/or for implementing the operating method as claimed in claim 6.

10. A solar protection installation (1) comprising an actuator (6) as claimed in claim 9.

11. A computer program comprising a computer program code means suitable for controlling all the steps of the method as claimed in claim 1, when the program runs on a computer.

* * * * *